United States Patent [19]  [11] 4,421,565
DiBella  [45] Dec. 20, 1983

[54] THIXOTROPIC AGENTS FOR ORGANIC SOLVENT-BASED SURFACE-COATING COMPOSITIONS AND SURFACE-COATING COMPOSITIONS CONTAINING SAME

[75] Inventor: Eugene P. DiBella, Piscataway, N.J.

[73] Assignee: Nuodex Inc., Piscataway, N.J.

[21] Appl. No.: 402,879

[22] Filed: Jul. 29, 1982

[51] Int. Cl.³ ............................ C08L 1/08; C09F 5/08; C08K 5/11
[52] U.S. Cl. ........................... 106/180; 106/262; 106/266; 260/410.6; 524/311
[58] Field of Search .................... 106/180; 260/410.6; 524/317

[56] References Cited

U.S. PATENT DOCUMENTS 2,640,038  5/1953  Wilder et al. .................... 106/245
3,925,278 12/1975  Murial et al. .................... 524/311

Primary Examiner—Theodore Morris
Attorney, Agent, or Firm—James P. Scullin

[57] ABSTRACT

A thixotropic agent for organic solvent-based surface-coating compositions is the product of the reaction of a polypentaerythritol component comprising tripentaerythritol with a saturated aliphatic monocarboxylic acid component comprising acids having 20 to 22 carbon atoms in amounts that provide from 0.40 mole to 0.96 mole of carboxyl groups per mole of hydroxyl groups.

14 Claims, No Drawings

THIXOTROPIC AGENTS FOR ORGANIC SOLVENT-BASED SURFACE-COATING COMPOSITIONS AND SURFACE-COATING COMPOSITIONS CONTAINING SAME

This invention relates to thixotropic agents for organic solvent-based surface-coating compositions and to surface-coating compositions that contain these thixotropic agents.

Thixotropic agents are commonly used in the formulation of organic solvent-based surface-coating compositions to facilitate their application by brushing or spraying, to allow the application of uniformly thick layers of the coatings to inclined or vertical surfaces without appreciable running or sagging, to minimize settling of the pigment and fillers during storage, to improve spill resistance, and to permit only low penetration of the coatings into porous materials to which they are applied.

Previously-used methods of imparting thixotropy to surface-coating compositions have involved the incorporation into the compositions of such thixotropy-imparting materials as finely-divided silica, surface active agents, hydrogenated castor oil, organic bentonite, i.e., bentonite impregnated with a quaternary ammonium compound, soaps, bodied oils, and the like. These methods have not proven to be entirely satisfactory because some of the additives do not provide the desired degree of thixotropy, while others have a deleterious effect on the properties of the finished surface-coating compositions. For example, organic bentonites are excellent thixotropic agents, but they impair the transparency and gloss of the compositions and reduce their stability during storage. The use of finely-divided silica results in films having unsatisfactory thickness and reduces the transparency and gloss of the coating compositions. Finely-powdered hydrogenated castor oil imparts excellent thixotropic properties to surface-coating compositions, but it has a restricted useful temperature range. For example, in the manufacture of paints and other coatings, it is not uncommon for the ingredients to be subjected to temperatures above 60° C. during ball milling or high speed mixing procedures. Under such conditions, hydrogenated castor oil tends to dissolve in the coating composition and to crystallize out on subsequent cooling. The crystals so deposited are much larger than the original micronized particles and are substantially ineffective as thixotropic agents. The effectiveness of hydrogenated castor oil as a thixotropic agent may thus be reduced or completely lost during paint manufacture. A further disadvantage of hydrogenated castor oil as a thixotropic agent is that crystals of it may be visible in the applied films giving rise to the defect known as seediness.

In accordance with this invention, it has been found that certain polypentaerythritol esters are excellent thixotropic agents for organic solvent-based coating compositions and that their use does not adversely affect the physical properties of the coating compositions.

The thixotropic agents of this invention are products of the reaction of a polypentaerythritol component that comprises tripentaerythritol with a saturated aliphatic monocarboxylic acid component that contains at least 50% by weight of acids having 20 to 22 carbon atoms in amounts that provide from 0.40 mole to 0.96 mole, preferably 0.70 mole to 0.90 mole, of carboxyl groups (—COOH) per mole of hydroxyl groups (—OH).

The polypentaerythritols that are used in the preparation of the thixotropic agents of this invention have the structural formula

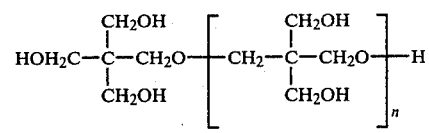

wherein n is an integer in the range of 1 to 13, preferably 2 to 4.

Polypentaerythritols are polyhydric alcohols which are higher molecular weight derivatives of pentaerythritol and which are formed by etherfication involving two or more molecules of pentaerythritol. The term polypentaerythritols includes dipentaerythritol, tripentaerythritol, tetrapentaerythritol, pentapentaerythritol, heptapentaerythritol, octapentaerythritol, decapentaerythritol, tetradecapentaerythritol, and the like and mixtures thereof. Procedures for the production of polypentaerythritols are disclosed in U.S. Pat. Nos. 2,462,049, 2,552,532, and 3,337,495. Other preparations are described in "The Pentaerythritols" by Berlow et al. (Reinhold Publishing Corp., New York, N.Y., 1958). While tripentaerythritol may be used as the sole polypentaerythritol in the preparation of the esters of this invention, polypentaerythritols that contain at least 50% by weight of tripentaerythritol or at least 75% by weight of tripentaerythritol and higher polypentaerythritols are usually used because of their commercial availability. The polypentaerythritol component preferably contains more than 70% by weight of tripentaerythritol or more than 90% by weight of tripentaerythritol and higher polypentaerythritols.

The trixotropic agents are prepared by reacting the polypentaerythritol component with a saturated aliphatic monocarboxylic acid component that contains at least 50% by weight, preferably at least 70% by weight, of acids having 20 to 22 carbon atoms. Particularly satisfactory results have been obtained using mixtures of saturated aliphatic monocarboxylic acids that contain about 40% or more of behenic acid and other acids having 22 carbon atoms. The acid component may also contain small amounts of unsaturated acids provided that the finished ester is a solid material at 35°–50° C., the temperature at which paint is ordinarily manufactured.

The polypentaerythritol esters are prepared by heating the polypentaerythritol component with the acid component in an inert atmosphere, such as nitrogen, at a temperature in the range of 200° to 280° C., preferably 220° to 250° C., until water is no longer evolved. The reaction mixture may also contain an acid catalyst, such as p-toluenesulfonic acid, methanesulfonic acid, or sulfuric acid, and/or an aliphatic or aromatic hydrocarbon, such as hexane, benzene, or xylene, which forms an azeotrope with water.

The amount of the acid component present in the reaction mixture is that which will provide a carboxyl group (—COOH) to hydroxyl groups (—OH) mole ratio of 0.40–0.96 to 1, preferably 0.70–0.90 to 1.

The solid esters prepared by the reaction of the polypentaerythritol component and the acid component may be ground to particles of the desired size and used without purification or other treatment as the thixotropic agent in organic solvent-based surface-coating compositions.

The thixotropic agents of this invention may be used in a wide variety of surface-coating compositions, including paints, varnishes, printing inks, adhesives, laminating agents, and the like. These surface-coating compositions usually comprise a resinous binder, an organic solvent, and such auxiliary materials as pigments, dyes, extenders, driers, fillers, emulsifiers, plasticizers, and the like. Illustrative of the useful resinous binders are acrylic resins, alkyd and modified alkyd resins, epoxy resins, polyester resins, polyamide resins, oleoresins, chlorinated rubbers, cellulose esters, nitrocellulose, polyurethane resins, and mixtures thereof. Suitable organic solvents include aliphatic and aromatic hydrocarbons such as benzene, toluene, xylene, mineral spirits, and solvent naphtha; aliphatic alcohols, ethers, and esters such as butanol, ethylene glycol monoethyl ether, and esters thereof; phenols; and mixtures thereof.

The amount of the thixotropic agent used in the compositions of this invention is that which will impart the desired thixotropic properties to the surface-coating composition. While the amount used in each case is dependent upon such factors as the choice of resinous binder, organic solvent, and thixotropic agent and the degree of thixotropy desired, it is generally in the range of from 0.1% to 20% by weight and preferably from 0.5% to 5% by weight, based on the weight of the surface-coating composition.

The thixotropic agents may be incorporated into the surface-coating compositions by any suitable and convenient procedure. For example, they may be combined with the pigment and other components to form a pigment phase that is mixed with the resinous binder and organic solvent to form the surface-coating composition.

The invention is further illustrated by the following examples. In these examples, all parts are parts by weight and all percentages are percentages by weight unless otherwise indicated.

EXAMPLE 1

A tripentaerythritol hexabehenate composition was prepared by the reaction of a commercial tripentaerythritol product with a commercial behenic acid product in amounts that provided a —COOH/—OH mole ratio of 6.2/8.0.

The commercial tripentaerythritol product had a water content of 0.5% and a hydroxyl number of 1151, and it contained the following polyhydric alcohols, as determined by GLC analysis:

| | |
|---|---|
| Monopentaerythritol | 0.7% |
| Depentaerythritol | 4.0 |
| Tripentaerythritol | 80.4 |
| Higher polypentaerythritols | 14.9 |

The commercial behenic acid had an iodine number of 0.57 and an acid number of 171.8, and it contained the following fatty acids, as determined by GLC analysis:

| | |
|---|---|
| $C_{22}$ Acids | 51.3% |
| $C_{20}$ Acids | 38.7 |
| $C_{18}$ Acids | 7.7 |
| Other Acids | 2.3 |

The tripentaerythritol hexabehenate composition was prepared by heating a mixture of 153.3 parts of the tripentaerythritol product (equivalent to 3.15 moles —OH groups) and 795.4 parts of the behenic acid product (equivalent to 2.44 moles —COOH groups) to a temperature in the range of 70°–80° C. until the behenic acid had melted. The mixture was then stirred and sparged with nitrogen at the rate of about 150 ml/min. while it was heated to 245°–250° C. over a period of one hour, during which time evolution of water started at 170°–200° C. and solution of the tripentaerythritol component occurred at 235°–240° C. The reaction mixture was sparged with nitrogen and heated at 245°–250° C. for 3 hours during which time 47 parts of water was evolved. It was then heated at 245°–250° C. at an absolute pressure of 25 mm with nitrogen sparging for three hours to complete the reaction. The resulting molten mass was cooled to 120° C., poured into a flat Pyrex dish, and allowed to solidify with ambient cooling.

There was obtained 901.5 parts of a tripentaerythritol hexabehenate composition which melted at 64°–66° C. and had an acid number of 0.76 and a saponification number of 160. This product was subjected to jet milling to produce a fine white powder that was suitable for use as a thixotropic agent for organic solvent-based paints.

EXAMPLE 2

Using different commercial tripentaerythritol products and different commercial behenic acid products, a series of tripentaerythritol hexabehenate compositions was prepared by the procedure described in Example 1.

The composition of the tripentaerythritol products that were used is shown in Table I.

TABLE I

| Polyhydric Alcohol | Tripentaerythritol Product | | | |
|---|---|---|---|---|
| Components (%) | TriPE-1 | TriPE-2 | TriPE-3 | TriPE-4 |
| Monopentaerythritol | 0.7 | 0.6 | 3.1 | 4.9 |
| Dipentaerythritol | 4.0 | 3.7 | 12.8 | 13.6 |
| Tripentaerythritol | 80.4 | 73.5 | 62.8 | 56.0 |
| Higher Polypentaerythritols | 14.9 | 22.2 | 21.3 | 26.0 |

The composition of the behenic acid products that were used is shown in Table II.

TABLE II

| Acid Components | Behenic Acid Products | | |
|---|---|---|---|
| (%) | BA-1 | BA-2 | BA-3 |
| $C_{22}$ Acids | 57.1 | 39.7 | 57.0 |
| $C_{20}$ Acids | 33.9 | 35.1 | 12.9 |
| $C_{18}$ Acids | 5.9 | 19.7 | 28.8 |
| $C_{16}$ Acids | 1.3 | 3.3 | 1.0 |
| Other Acids | 1.8 | 2.2 | 0.3 |

The tripentaerythritol products and the behenic acid products used in the preparation of the tripentaerythritol behenates and the —COOH/—OH mole ratios used in the preparation of the esters are set forth in Table III.

Each of the ester compositions was evaluated as a thixotropic agent in an organic solvent-based paint system by incorporating it into the chlorinated rubber formulation described in Example 3A and measuring the viscosity buildup of the paint over a 10 hour period. The viscosity of each paint, which was determined using a Stormer Viscometer, is reported in Krebs Units in Table III.

TABLE III

| Ex. No. | Tripenta-erythritol Product | Behenic Acid Product | Mole Ratio —COOR/—OH | Viscosity (KU) |
|---|---|---|---|---|
| 2-1 | TriPE-1 | BA-1 | 0.89 | 83 |
| 2-2 | TriPE-1 | BA-1 | 0.80 | 80 |
| 2-3 | TriPE-1 | BA-1 | 0.79 | 75 |
| 2-4 | TriPE-1 | BA-1 | 0.77 | 80 |
| 2-5 | TriPE-1 | BA-1 | 0.76 | 78 |
| 2-6 | TriPE-1 | BA-1 | 0.75 | 75 |
| 2-7 | TriPE-1 | BA-1 | 0.74 | 75 |
| 2-8 | TriPE-1 | BA-1 | 0.72 | 78 |
| 2-9 | TriPE-2 | BA-1 | 0.87 | 82 |
| 2-10 | TriPE-2 | BA-1 | 0.82 | 78 |
| 2-11 | TriPE-2 | BA-1 | 0.78 | 75 |
| 2-12 | TriPE-2 | BA-1 | 0.46 | 70 |
| 2-13 | TriPE-3 | BA-1 | 0.83 | 70 |
| 2-14 | TriPE-3 | BA-1 | 0.81 | 72 |
| 2-15 | TriPE-3 | Ba-2 | 0.96 | 65 |
| 2-16 | TriPE-3 | BA-2 | 0.83 | 80 |
| 2-17 | TriPE-3 | BA-2 | 0.74 | 70 |
| 2-18 | TriPE-3 | BA-2 | 0.68 | 68 |
| 2-19 | TriPE-3 | BA-2 | 0.55 | 68 |
| 2-20 | TriPE-3 | BA-2 | 0.41 | 68 |
| 2-21 | TriPE-3 | BA-3 | 0.96 | 68 |
| 2-23 | TriPE-3 | BA-3 | 0.82 | 68 |
| 2-23 | TriPE-3 | BA-3 | 0.69 | 75 |
| 2-24 | TriPE-3 | BA-3 | 0.59 | 71 |
| 2-25 | TriPE-3 | BA-3 | 0.41 | 68 |
| 2-26 | TriPE-4 | BA-1 | 0.81 | 73 |

COMPARATIVE EXAMPLES A–C

For comparative purposes, a series of monopentaerythritol, dipentaerythritol, and tripentaerythritol esters of fatty acids was prepared. The polyhydric alcohol and acid components that were used, the —COOH/—OH ratios, and the viscosity of the esters are set forth in Table IV.

TABLE IV

Comparative Examples

| Ex. No. | Polyhydric Alcohol Component | Acid Component | Mole Ratio —COOH/—OH | Viscosity (KU) |
|---|---|---|---|---|
| A | Dipenta-erythritol (4.5% PE, 86.5% DiPE, 5.9% TriPE, 3.1% Poly PE) | BA-1 | 0.75 | 66 |
| B | Monopenta-erythritol (>98% PE) | BA-1 | 0.75 | 65 |
| C | TriPE-3 | Stearic Acid (90% C$_{18}$ Acids, 10% C$_{16}$ Acids) | 0.75 | 60 |

EXAMPLE 3

The efficacy of the product of Example 1 as the thixotropic agent in various types of organic solvent-based surface-coating compositions was demonstrated by incorporating this ester or a comparative thixotropic agent in a chlorinated rubber-based paint, an epoxy resin-based paint, a semi gloss soya alkyd resin-based paint, and a gloss soya alkyd resin-based paint and determining the properties of the resulting paints.

The organic solvent-based paint systems that were used in this evaluation were prepared by the following procedures.

A. Chlorinated Rubber System

High Build Chlorinated Rubber White Paint was prepared by grinding the following materials together to 5–6 Hegman in a Cowles Dissolver at 4500 rpm:

| | |
|---|---|
| Xylene | 250 parts |
| Epoxy Resin | 5 |
| Chlorinated Rubber | 170 |
| Chlorinated Hydrocarbon | 113 |
| Dispersing Agent | 15 |
| Titanium Dioxide | 142 |

To the resulting mixture was added 106 parts of xylene, 5 parts of epoxy resin, and a pre-gel prepared by mixing together

| | |
|---|---|
| Chlorinated paraffin | 58 parts |
| Thixotropic Agent | 14 |
| Titanium Dioxide | 27 |
| Xylene | 95 |

B. Epoxy Resin System

High Build Epoxy/Ketimine Cured Paint was prepared by mixing the following materials together:

| | |
|---|---|
| Epoxy Resin | 200 parts |
| Dispersing Agent | 25 |
| Silicone Resin | 10 |
| Titanium Dioxide | 150 |
| Barium Sulfate | 147 |
| Thixotropic Agent | 5 |
| Solution containing 83% phenol and 17% n-butanol | 30 |
| Talc | 159.5 |
| Epoxy Resin | 260 |
| Ethylene glycol monoethyl ether | 10 |

This epoxy resin system was cured by incorporating in it a curing agent containing 98 parts of Shell H-3 ketimine and 2 parts of fumed silica in the amount of one part by volume of the curing agent per four parts by volume of the epoxy resin system.

C. Semigloss Soya Alkyd System

A white semigloss enamel was prepared by mixing together the following materials:

| | |
|---|---|
| Titanium Dioxide | 250 parts |
| Calcium Carbonate | 250 |
| Thixotropic Agent | 6 |
| Basic Lead Naphthenate | 3 |
| Soya Alkyd Resin | 156 |
| Mineral Spirits | 30 |

When this mixture had been ground in a Cowles Dissolver, the following materials were added to it:

| | |
|---|---|
| Soya Alkyd Resin | 156 parts |
| Bodying Oil | 200 |
| Mineral Spirits | 38 |
| Cobalt Naphthenate | 2 |
| Lead Naphthenate | 4 |
| Antiskinning Agent | 1.5 |

D. Gloss Soya Alkyd System

A white gloss enamel was prepared by mixing the following materials together:

| | |
|---|---|
| Soya Alkyd Resin | 99 parts |
| Zinc Oxide | 17 |
| Thixotropic Agent | 10 |
| Mineral Spirits | 50 |
| Dispersing Agent | 3.5 |
| Titanium Dioxide | 345 |

When this mixture has been ground in a Cowles Dissolver for 20 minutes, the following materials were added to it:

| | |
|---|---|
| Soya Alkyd Resin | 500 parts |
| Mineral Spirits | 46 |
| Cobalt Drier | 3 |
| Bismuth/Calcium Drier | 3.87 |
| Antiskinning Agent | 0.90 |

The thixotropic agent that was used in the production of these paints was either the product of Example 1 or a commercially-available thixotropic agent THIXATROL ST (NL Industries), which is composed principally of hydrogenated castor oil.

The viscosity of the paint systems was measured using a Stormer Viscometer and is reported in Krebs Units. Sag was determined using an antisag meter on presheared paint by the procedure described in Federal Test No. 141, Method 4494. Salt spray exposure was carried out for 650 hours with a 5% salt solution in accordance with ASTM D 1654. A Gardner Glossmeter was used for measuring 60° gloss in a 1000 hour Weatherometer exposure test. Water immersion tests were conducted according to ASTM D 870, with related blistering effects evaluated according to ASTM D 714.

The properties of the organic solvent-based paint systems are summarized in Tables V–VIII.

TABLE V

Properties of Paint Systems Containing as Thixotropic Agent either Tripentaerythritol Hexabehenate or a Comparative Agent

| | Thixotropic Agent | |
|---|---|---|
| Properties of Paint Systems | Tripentaerythritol Hexabehenate (Product of Ex. 1) | Comparative Thixotropic Agent (Thixatrol ST) |
| Chlorinated Rubber Paint | | |
| Initial Viscosity (10 hrs) | 89 KU | 85 KU |
| Sag | 20 mils | 20 mils |
| Leveling | 4 | 4 |
| 60° Gloss | 20 | 70 |
| Yellowness Index | 3.89 | 3.86 |
| Hegman Grind | 5½ | 4 |
| Stability 1 Month (120° F.) | | |
| Hegman Grind | 5½ | 1 |
| 60° Gloss | 14 | 10 |
| Viscosity | 90 KU | 90 KU |
| Sag | 20 | 20 |
| Epoxy Paint | | |
| 60° Gloss | 95 | 95 |
| Sag | 20 mils | 20 mils |
| Hegman Grind | 6 | 5 |
| Stability 1 month (120° F.) | Good | Good |
| Semi Gloss Alkyd Paint | | |
| Initial Viscosity (2 hrs.) | 101 KU | 100 KU |
| Sag | 14 mils | 20 mils |
| 60° Gloss | 24 | 26 |

TABLE V-continued

Properties of Paint Systems Containing as Thixotropic Agent either Tripentaerythritol Hexabehenate or a Comparative Agent

| | Thixotropic Agent | |
|---|---|---|
| Properties of Paint Systems | Tripentaerythritol Hexabehenate (Product of Ex. 1) | Comparative Thixotropic Agent (Thixatrol ST) |
| Yellowness Index | 4.5 | 4.8 |
| Stability 1 Month (120° F.) | | |
| Viscosity | 110 KU | 127 KU |
| 60° Gloss | 34 | 30 |
| Sag | 16 mils | 20 mils |
| Appearance | Good | Fair |
| Gloss Soya Alkyd Paint | | |
| Initial Viscosity (2 hrs.) | 82 KU | 84 KU |
| Sag | 20 mils | 20 mils |
| 60° Gloss | 82 | 78 |
| Stability 1 Month (120° F.) | | |
| Viscosity | 85 KU | 90 KU |
| 60° Gloss | 82 | 79 |
| Sag | 20 mils | 20 mils |
| Appearance | Good | Good |

TABLE VI

Exposure Testing in Weatherometer Sunshine/water Cycle

| | | | 60° Gloss | |
|---|---|---|---|---|
| Coating | Thixotropic Agent | Exposure Time (Hours) | Initial | After Exposure |
| Chlorinated Rubber | Prod. of Ex. 1 | 1000 | 20 | 8 |
| | Thixatrol ST | 1000 | 70 | 10 |
| Epoxy | Prod. of Ex. 1 | 500 | 95 | 15 |
| | Thixatrol ST | 500 | 95 | 5 |
| Semi Gloss Soya Alkyd | Prod. of Ex. 1 | 500 | 24 | 10 |
| | Thixatrol ST | 500 | 26 | 8 |
| Gloss Soya Alkyd | Prod. of Ex. 1 | 1000 | 82 | 9 |
| | Thixatrol ST | 1000 | 78 | 8 |

TABLE VII

Exposure Testing - Salt Spray (5%) 650 Hours

| Coating | Thixotropic Agent | Creepage | Corrosion |
|---|---|---|---|
| Chlorinated Rubber | Prod. of Ex. 1 | ¼" | 8 |
| | Thixatrol ST | ¼" | 7 |
| Epoxy | Prod. of Ex. 1 | 1/32" | 9 |
| | Thixatrol ST | 1/16" | 9 |
| Semi Gloss Soya Alkyd | Prod. of Ex. 1 | ¼" | 8 |
| | Thixatrol ST | ¼" | 6 |
| Gloss Soya Alkyd | Prod. of Ex. 1 | 1/32" | 6 |
| | Thixatrol ST | 1/32" | 4 |

TABLE VIII

Exposure Testing - Water Immersion (ASTM D 870 - Water Immersion Test of Organic Coatings on Steel)

| Coating | Thixotropic Agent | Frequency of Blisters* | | Size of Blisters** |
|---|---|---|---|---|
| Chlorinated Rubber | Prod. of Ex. 1 | None | (500 Hrs.) | — |
| | Thixatrol ST | None | (500 Hrs.) | — |
| Epoxy | Prod. of Ex. 1 | None | (500 Hrs.) | — |
| | Thixatrol ST | None | (500 Hrs.) | — |
| Semi Gloss Soya Alkyd | Prod. of Ex. 1 | D | (160 Hrs.) | 8 |
| | Thixatrol ST | D | (160 Hrs.) | 6 |
| Gloss Soya Alkyd | Prod. of Ex. 1 | MD | (160 Hrs.) | 8 |
| | Thixatrol ST | MD | (160 Hrs.) | 7 |

*D = Dense
MD = Medium Dense
**1 = Large Blisters; 10 = Small Blisters

From the data in the foregoing tables, it will be seen that the tripentaerythritol hexabehenate composition is as effective as the commercial thixotropic agent in a variety of organic solvent-based surface coating systems.

In the chlorinated rubber paint formulation, the thixotropic agent of this invention, unlike the comparative thixotropic agent, did not seed out at relatively high processing temperatures (above 35° C.), and it contributed to improved stability of the system. At an equal use level, the tripentaerythritol hexabehenate composition and the comparative thixotropic agent imparted equivalent sag resistance and viscosity to the system. The gloss values for both thickener systems were nearly equal after exposure.

In the other paint systems, paint properties for both thixotropic agents were equivalent.

Paints containing the thixotropic agent of this invention had resistance to exposure in the weatherometer, to salt spray, and to water immersion that were equal to or better than those of the paints containing the comparative thixotropic agent.

From the data in Tables V–VIII, it will be seen that tripentaerythritol hexabehenate is an effective thixotropic agent that is suitable for use in a variety of organic solvent-based surface-coating compositions. It is particularly well suited for use in systems containing aromatic solvents, such as chlorinated rubber coatings, since it is not prone to seeding at high processing temperatures. In addition, this thixotropic agent effectively controls sagging in high build coatings with no adverse effects on paint stability or film durability.

The thixotropic surface-coating compositions of this invention may be brushed or sprayed onto substrates, and they exhibit little or no sag when applied to inclined or vertical surfaces.

Each of the other polypentaerythritol ester components disclosed herein can be used in a similar way as the thixotropic agent in a variety of organic solvent-based surface-coating compositions.

What is claimed is:

1. A thixotropic agent for organic solvent-based surface-coating compositions that is the product of the reaction of (a) a polypentaerythritol component that contains at least 70% by weight of tripentaerythritol and more than 90% by weight of tripentaerythritol and higher polypentaerythritols with (b) a saturated aliphatic monocarboxylic acid component that contains at least 70% by weight of acids having 20 to 22 carbon atoms, in amounts that provide from 0.70 mole to 0.90 mole of carboxyl groups per mole of hydroxyl groups.

2. A thixotropic agent as defined in claim 1 wherein the polypentaerythritol component contains at least 70% by weight of tripentaerythritol and more than 95% by weight of tripentaerythritol and higher polypentaerythritols.

3. A thixotropic agent as defined in claim 1 wherein the acid component contains more than 90% by weight of acids having 20 to 22 carbon atoms.

4. A thixotropic agent as defined in claim 1 that comprises tripentaerythritol hexabehenate.

5. A thixotropic surface-coating composition that comprises a resinous binder, an organic solvent, and from 0.1% to 20% by weight, based on the weight of said composition, of a thixotropic agent that is the product of the reaction of (a) a polypentaerythritol component that contains at least 70% by weight of tripentaerythritol and more than 90% by weight of tripentaerythritol and higher polypentaerythritols with (b) a saturated aliphatic monocarboxylic acid component that contains at least 70% by weight of acids having 20 to 22 carbon atoms, in amounts that provide from 0.70 mole to 0.90 mole of carboxyl groups per mole of hydroxyl groups.

6. A thixotropic surface-coating composition as defined in claim 5 wherein the polypentaerythritol component contains at least 70% by weight of tripentaerythritol and more than 95% by weight of tripentaerythritol and higher polypentaerythritols.

7. A thixotropic surface-coating composition as defined in claim 5 wherein the acid component contains more than 90% by weight of acids having 20 to 22 carbon atoms.

8. A thixotropic surface-coating composition as defined in claim 5 wherein the thixotropic agent comprises tripentaerythritol hexabehenate.

9. A thixotropic surface-coating composition as defined in claim 5 that contains from 0.5% to 5% by weight, based on the weight of the composition, of said thixotropic agent.

10. In the process of forming a surface-coating composition that comprises a resinous binder and an organic solvent, the improvement comprising incorporating into said surface-coating composition from 0.1% to 20% by weight, based on the weight of said composition, of a thixotropic agent that is the product of the reaction of (a) a polypentaerythritol component that contains at least 70% by weight of tripentaerythritol and more than 90% by weight of tripentaerythritol and higher polypentaerythritols with (b) a saturated aliphatic monocarboxylic acid component that contains at least 70% by weight of acids having 20 to 22 carbon atoms, in amounts that provide from 0.70 mole to 0.90 mole of carboxyl groups per mole of hydroxyl groups.

11. The process of claim 10 wherein the polypentaerythritol component contains at least 70% by weight of tripentaerythritol and more than 95% by weight of tripentaerythritol and higher polypentaerythritols.

12. The process of claim 10 wherein the acid component contains more than 90% by weight of acids having 20 to 22 carbon atoms.

13. The process of claim 10 wherein 0.5% to 5% by weight, based on the weight of said composition, is incorporated into said surface-coating composition.

14. The process of claim 10 wherein the thixotropic agent comprises tripentaerythritol hexabehenate.

* * * * *